United States Patent [19]

Skillman

[11] Patent Number: 5,178,184
[45] Date of Patent: Jan. 12, 1993

[54] PUMP VALVE APPARATUS

[76] Inventor: Milton M. Skillman, Rte. 1, Box 216, Mt. Vernon, Tex. 75457

[21] Appl. No.: 745,062

[22] Filed: Aug. 12, 1991

[51] Int. Cl.[5] .............................................. F16K 15/04
[52] U.S. Cl. ........................... 137/533.13; 137/533.15; 417/554
[58] Field of Search ...................... 137/533.11–533.15; 417/554

[56] References Cited

U.S. PATENT DOCUMENTS

| 2,192,541 | 3/1940 | Davis | 137/533.13 X |
| 2,578,069 | 12/1951 | Jones | 137/533.15 X |
| 2,899,974 | 8/1959 | Gratzmuller | 137/533.11 |
| 3,168,052 | 2/1965 | Pate | 417/554 |
| 3,260,279 | 7/1966 | Liebmann | 137/533.15 |
| 4,691,735 | 9/1987 | Horton | 137/533.13 X |

Primary Examiner—Robert G. Nilson
Attorney, Agent, or Firm—Bill B. Berryhill

[57] ABSTRACT

A valve having a tubular valve body, an inlet, an outlet and a flow passage therebetween. A valve seat is carried by the valve body at the inlet. A cylindrical cage with flow ports through its walls is carried by the valve body, the interior of which defines a cylindrical enclosure open at the end nearest the inlet and partially closed by an end wall at the opposite end. A ball closure member is carried within the cage for limited axial movement between a seated terminal portion, blocking reverse flow through the valve, and an unseated terminal position unblocking flow through the valve.

14 Claims, 1 Drawing Sheet

PUMP VALVE APPARATUS

BACKGROUND OF THE INVENTION

1. Field of the Invention

The present invention pertains to valve apparatus. More specifically, the present invention pertains to valve apparatus for allowing fluid flow in one direction but preventing reverse fluid flow therethrough. In particular, the present invention pertains to valves particularly suitable for use with reciprocating pumps of the type used in subsurface oil well pumping.

2. Description of the Prior Art

Lift pumps for lifting subsurface fluids to the surface of an oil well have been in existence for many years. Lift pumps usually include a tubular barrel (which may be a portion of the production tubing) and a cooperating plunger assembly which reciprocataes therein. The plunger assembly may be attached to a rod which extends to the surface of the well and by which the plunger assembly may be reciprocated.

A lift pump typically includes a standing valve which is fixed relative to the pump barrel and a traveling value which is fixed to the plunger assembly. The standing valve and traveling valve, act as check values, opening and closing, opposite of each other, on upstrokes and downstrokes of the plunger assembly. For example, as the plunger assembly and the attached traveling valve are lowered on a downstroke, the standing valve is closed, blocking reverse fluid flow therethrough, and the traveling valve is opened allowing fluid within the pump barrel to be displaced through the traveling valve into the tubing thereabove. On the subsequent upstroke, the traveling valve closes, lifting the fluids thereabove toward the surface. Since pressure in the pump barrel below the traveling valve decreases during the upstroke, the standing valve then opens allowing fluid to flow into the pump barrel for a succeeding downstroke. As this process continues, fluid flows through the standing valve and into the pump barrel during the upstrokes and through the traveling valve toward the surface of the well on the upstroke.

Most of the standing valves and traveling valves of the prior art, provide a ball closure member which is carried for limited axial movement, within a ball valve cage, from a seated position, blocking flow through the valve, to an unseated position in which fluid flow exits the valve through radially directed passages or ports. Examples of such valves may be seen in U.S. Pat. Nos. 1,443,016; 1,626,549; and 2,937,659. In these pump valves of the prior art, the ball closure members are lifted by fluid flow and the differential pressures existing between the inlet side and outlet side of the valve. The ball is thus subjected to considerable deterioration from erosive and/or corrosive flow and from constant uncontrolled reciprocation within the valve cage. In addition, uncontrolled up and down movement of the ball closure member may damage the seating surfaces of the valve seat. Such deterioration of the ball closure member and the seat may result in fluid leakage requiring costly removal and repair procedures.

Another problem associated with pump valves of the prior art is that associated with the outward flow through the ball valve cage ports or passages as fluid flows toward the surface of the well. With the valves of the prior art, this outward flow of fluid, which may contain sand or other erosive materials, may erode the surrounding pump barrel, eventually penetrating its walls. This type of flow may also create irregular surfaces in which friction between the reciprocating plunger assembly and the surrounding barrel is so increased that undue wear and leakage may occur, substantially reducing pumping efficiencies. In either case, an expensive pulling and repair operation may be required.

Some attempts have been made to overcome the aforementioned problems of pump valves of the prior art. One example of such may be seen in U.S. Pat. No. 4,691,735. In this valve, a piston is provided for lifting the ball closure member of a pump valve off of its seat within a ball protection shield or cage above openings in the cage. This is supposed to contain the uncontrolled movement of the valve ball closure member and protect the ball from erosive fluid flow. While these characteristics of the valve appear to have been improved, this valve requires a piston member for lifting the ball valve from its seat. Thus, another component is added to the valve requiring additional length and sealing surfaces. Furthermore, the piston reduces flow through the valve by reducing flow areas and adding friction increasing ports through the piston. Obviously, additional improvements in the subsurface pump valve art are needed.

SUMMARY OF THE PRESENT INVENTION

The present invention discloses a pump valve, suitable for use as a standing valve or a traveling valve, which comprises a tubular valve body having an inlet, an outlet, and a flow passage therebetween. A valve seat is carried by the valve body at the inlet. A cylindrical cage is carried by the valve body, the interior of which defines a cylindrical enclosure open at the end nearest the inlet and partially closed by an end wall at its opposite end. The exterior of the cage and the surrounding portion of the valve body define an annular chamber which is in fluid communication with the interior of the cage through ports in the cylindrical walls thereof. A ball closure member is carried within the cage for limited axial movement therein between a seated terminal position engaging the valve seat, blocking reverse flow of fluid through the valve, and an unseated terminal position engaging the end wall, unblocking flow of fluid through the valve.

The ball closure member is movable toward its unseated terminal position in response to a decrease in pressure within the valve body relative to pressure at the valve inlet. As this occurs, any fluid between the ball closure member and the end wall may exit through a central aperture in the end wall. As flow continues through the cage ports, the surrounding annular space and through the valve outlet, a partial vacuum is created in the space between the ball closure member and the end wall helping keep the ball closure member in its unseated position and preventing uncontrolled movement thereof. The ball closure member is thus held well away from the fluid flow through the valve preventing undue erosion and damage to the valve and its ball closure member.

Another object of the valve of the present invention is to provide fluid flow to the valve which is totally contained within the walls of the tubular valve body so that impinging flow against the pump barrel is prevented, reducing harmful erosion of the pump barrel and the sealing surfaces between the pump barrel and the pump plunger assembly.

Another object of the valve of the present invention is to provide a valve with the characteristics just discussed which can be used as either a standing valve or a traveling valve by providing a central port in an end wall which may be used as a flow port but which is adapted to engagingly receive a rod member by which an axial force may be applied to the valve for reciprocation thereof as a traveling valve.

Thus the pump valve of the present invention provides much improved flow and ball closure control characteristics without substantially increasing the complexity of the valve. The valve of the present invention is easily and economically manufactured, installed, used and repaired. Many other objects and advantages of the invention will be apparent from reading the description which follows in conjunction with the accompanying drawings.

DESCRIPTION OF A PREFERRED EMBODIMENT OF THE INVENTION

Figure 1:
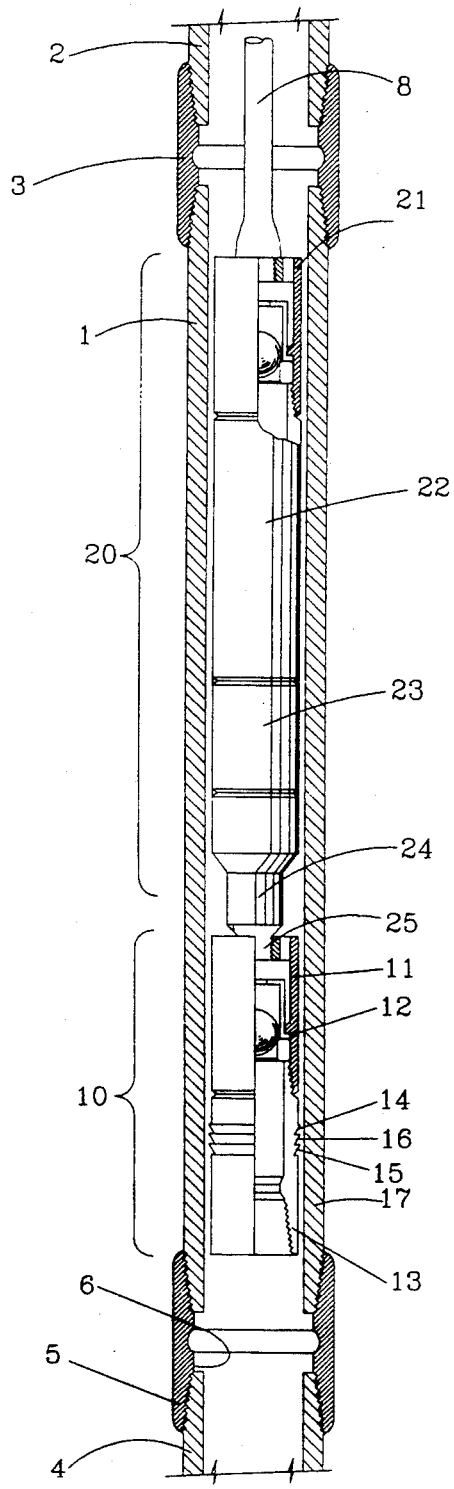
FIG. 1 is a longitudinal view of a lift pump, partially in section, utilizing one or more pump valves according to a preferred embodiment of the invention.

Referring first to FIG. 1, there is shown a section of tubing 1 which may form part of a production tubing string in an oil well. Sections of tubing 2 may be connected above section 1 by appropriate connections such as a threaded collar 3. The tubing section 1 may be the last or the lowermost tubing joint. On the other hand, additional joints 4 may be attached therebelow by collars 5 or the like. It should be noted that the collar 5 has a tapered seating surface 6. The tubing section 1 also serves as the cylindrical barrel of a lift pump which comprises a standing valve assembly 10 and a plunger and traveling valve assembly 20.

The standing valve assembly 10 includes a check valve referred to in the industry as a standing valve 11 attached to a tubular holddown body 12 and an anchor coupling 13. Mounted on the holddown body 12 above the anchor coupling 13 is a pair of seating cups 14, 15, separated by a spacer ring 16. In some cases a lock nut 17 may form part of the assembly. The lower end of the anchor coupling 13 is tapered to correspond with the tapered surface 6 of the tubing coupling 5.

The plunger and traveling valve assembly 20 comprises another check valve 21, similar or identical to the standing valve 11, which is referred to in the industry as a "traveling valve". Below the traveling valve 21 is a tubular plunger 22, the exterior of which is machined to close tolerances and highly polished for reciprocation within the polished interior of the tubing section or barrel 1. In some cases, another traveling valve 23 may be attached below the plunger 22. At the bottom of the traveling valve and plunger assembly 20 is a standing valve puller 24, which in the exemplary embodiment, has a threaded nose 25 for engagement with corresponding threads of the standing valve 11. Attached to the upper end of the traveling valve 21 is a rod member 8 which extends to the surface of the well for attachment to some source of power for alternately raising and lowering of the traveling valve and plunger assembly 20 within the pump barrel 11.

Initially, the standing valve assembly 10 is attached to the traveling valve and plunger assembly 20 by threaded connection with the threaded nose 25 of the standing valve puller 24. Both assemblies are lowered into the well until the tapered nose of the anchor coupling 13 engages the tapered seating surface 6 of collar 5. At this point the seating cups 14 and 15 are actuated so as to sealingly engage the surrounding pipe section or barrel 1 to firmly hold the standing valve assembly 10 in place. Then the traveling valve and plunger assembly 20 is separated from the standing valve assembly 10 by rotating to disengage the threaded connection therebetween. The standing valve and plunger assembly 20 is lifted a short distance, remaining in the hole as shown in FIG. 1, free for reciprocation within the pump barrel 1.

All of the components of the standing valve assembly 10 and traveling valve and plunger assembly 20 have longitudinal flow passages therethrough, flow through which is interrupted only by standing valve 11 and traveling valves 21 and 23. Assuming that there is fluid to be produced from the well in which this apparatus is installed, an initial upstroke of the traveling valve and plunger assembly 20 will create a partial vacuum within the pump barrel 1 above the standing valve assembly 10. As this occurs, fluid will flow from the well through the flow passages of standing valve assembly 10 and through the standing valve 11 into the space of the barrel 1 above the standing valve 11. On the subsequent downstroke of the traveling valve and plunger assembly 20, the standing valve 11 closes preventing reverse flow therethrough and the fluid above the standing valve 11 is forced through the traveling valve and plunger assembly 20, including the traveling valves 21 and 23, into the tubing string surrounding rod 8. On the subsequent upstroke, the traveling valves 21 and 23 close preventing reverse flow therethrough and the fluid above the traveling valve and plunger assembly 20 is lifted toward the surface of the well. As the traveling valves 21, 23 close during the upstroke, the standing valve 11, in response to the lower pressure thereabove, opens allowing additional fluid to enter the pump barrel 1. The cycle continues with the standing valve 11 and the traveling valves 21, 23 alternately opening and closing, the traveling valves being opened when the standing valve is closed and vice versa.

Most of the apparatus and operation of a lift pump as just described are known in the art. However, the standing valve 11 and traveling valve 21 are unique. Such valves will now be described with reference to FIGS. 2 and 3. The description will be of the standing valve 11. However, as will be understood hereafter, the standing valve 11 can also serve as the traveling valve 21.

Figure 2:
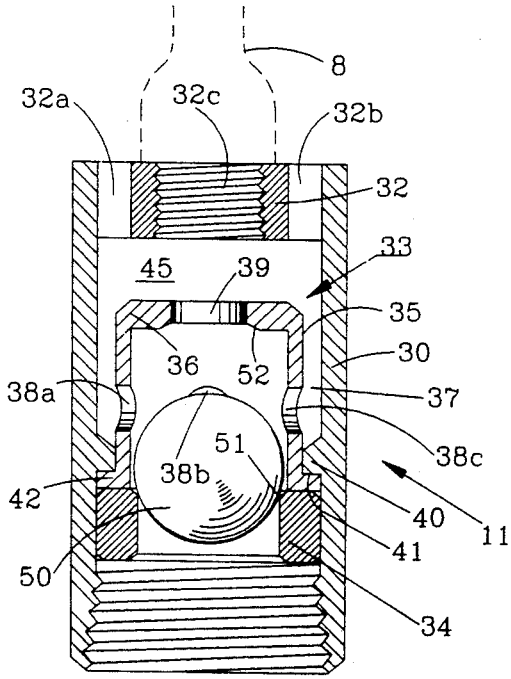
FIG. 2 is a longitudinal sectional view of a pump valve according to a preferred embodiment of the invention, showing the valve in its closed position.
Figure 3:
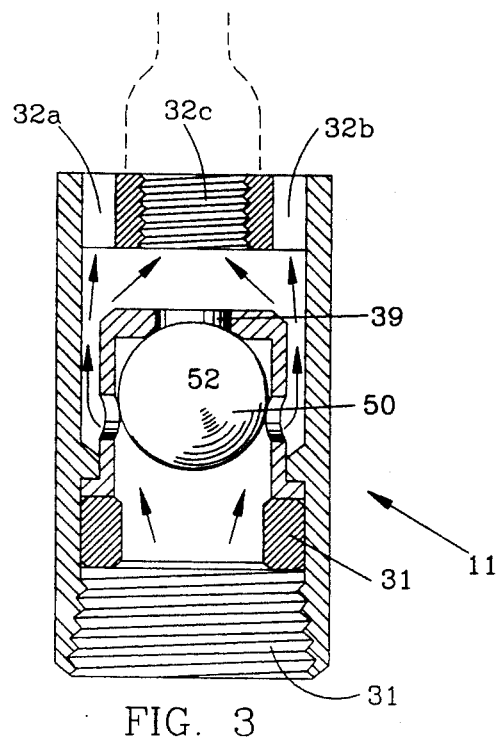
FIG. 3 is a longitudinal sectional view of a pump valve, according to a preferred embodiment of the invention, showing the valve in its open position.

The standing valve 11, as shown in FIGS. 2 and 3, includes a tubular valve body 30 having an inlet 31 one or more outlets 32a, 32b, 32c, etc. and a flow passage 33 therebetween. Carried by the valve body 30 at the inlet 31 is a valve seat member 34. Also carried by the valve body 30 is a cylindrical cage 35, the interior of which defines a cylindrical enclosure open at the end nearest the inlet 31 and partially closed by an annular end wall 36 at the opposite end. The exterior of the cage 35 and the surrounding portion of the valve body 30 define an annular chamber 37 which is in fluid communication with the interior of the cage 35 through ports 38a, 38b, 38c, etc. in the cylindrical walls of the cage 35. In the preferred embodiment of the invention, an aperture 39 is centrally disposed in the end wall 36 providing fluid communication between the interior of the cage 35 and the flow passage 33 unless blocked, as shown in FIG. 3.

The interior of the standing valve 11 may be provided with an inwardly projecting shoulder having an annular surface 41 against which may rest a corresponding annular surface of an annular flange 42 at the open end of the cage 35. The valve seat 34 rests against the cage flange 42 holding the cage 35 in place. The exterior of seat 34 may be threaded for engagement with threads 31a of inlet 31. This allows removal and repair or replacement of the seat 34, cage 35 and ball 50.

Carried within the cage 35 for limited axial movement therein between a seated terminal position, as shown in FIG. 2, and a unseated terminal position, as shown in FIG. 3, is the ball closure member 50. The diameter of the ball closure member 50 is slightly less than the internal diameter of the cylindrical cage member 35 permitting substantially free limited axial movement of the ball closure member within the cage 35 but substantially preventing any fluid flow between the ball closure member 50 and the surrounding cage 35 when the ball closure member is in its unseated terminal position of FIG. 3. In the seated terminal position of FIG. 2, the ball closure member 50 engages a corresponding seating surface 51 on the seat member 34, blocking reverse flow of fluid through the valve 11. In the unseated terminal position of FIG. 3, the ball closure member 50 engages the end wall 36 permitting flow of fluid through the valve 11, via inlet 31, valve seat 34, cage ports 38a, 38b, 38c, etc., annular chamber 37, cylindrical chamber 45 and outlets 32a, 32b, 32c, etc..

With the standing valve 11 installed as shown in FIG. 1 and the plunger 22 moving downwardly or at rest, the ball closure member 50 will engage the seating surface 51 of the valve seat 34, as shown in FIG. 2, blocking reverse fluid flow through the valve 11. As the traveling valve and plunger assembly 20 begins an upstroke, the pressure within the pump barrel 1 decreases relative to fluid pressure at the inlet 31. As this occurs, the ball closure member 50 is lifted from its seated terminal position of FIG. 2 toward the unseated terminal position of FIG. 3. Fluid then begins to flow through the inlet 31 and seat 34 into the interior of the cage member 35. As the ball closure member 50 begins to rise toward the end wall 36, any fluid trapped above the ball closure member 50 within the cage 35 is displaced through the central aperture 39 into the cylindrical chamber 45. The lower pressure within the cylindrical chamber 45 will assist in raising the ball closure member to the unseated terminal position of FIG. 3 where the ball engages the seating surface 52 around the aperture 39. Thus fluid flowing beneath the ball 50 and the reduced pressure within the cylindrical chamber 45 serve to hold the ball closure member 50 in its unseated terminal position preventing uncontrolled up and down movement thereof and keeping most of the surfaces of the ball closure member 50 from exposure to fluid flowing through the valve.

As fluid flows from the well through the valve inlet 31 into the interior of the cage 35, it continues through the ports 38a, 38b, 38c, etc., the annular chamber 37, cylindrical chamber 45 for exit through the outlet ports 32a, 32b, 32c, etc.. This flow continues during the upstroke of the traveling valve and plunger assembly 20 (see FIG. 1). Of course when the subsequent downstroke begins, the ball closure member 50, due to gravity and increased pressure within the pump barrel 1, reassumes its seated terminal position of FIG. 2, blocking reverse flow of fluid through the valve 11.

As previously mentioned, the standing valve 11 may be utilized as a traveling valve such as the traveling valve 21. In such case, the centrally disposed outlet 32c, which is coaxially aligned with the central axis of the valve body 11, may be adapted, by threads or the like, to engagingly receive the lower end of a rod member 8 (indicated by dotted lines in FIG. 2). In this manner, the standing valve 11 becomes the traveling valve 21, the rod member 8 providing the means by which an axial force may be applied to the traveling valve and plunger assembly 20 for reciprocation thereof within the surrounding pump barrel 1.

Thus, the valve of the present invention, whether used as a standing valve or traveling valve, provides a valve in which the ball closure member is more positively controlled and subjected to less harmful fluid erosion. This also reduces wear on the valve seat so that the ball closure member, cage and valve seat have a substantially longer useful life, without repair, than ball closure members, cages and seats of valves of the prior art. In addition, the unique flow of the valve of the present invention confines flow within the valve body and as flow leaves the valve it is directed in a vertical or longitudinal direction so that fluid flow is not directed outwardly against the pump barrel 1 and the corresponding sealing surfaces between the pump barrel and the plunger. Thus, both the pump barrel and plunger have a longer useful life. These features combine to result in a lift pump operation which is superior in operation, maintenance and length of service to those of the prior art. Many costly hours of downtime and remedial operations are thus prevented.

This specification has described a preferred embodiment of valve of the present invention which is used as a standing valve or a traveling valve in an oil well lift pump system. While a single preferred embodiment has been described, many variations can be made by those skilled in the art without departing from the spirit of the invention. Accordingly, it is intended that the scope of the invention be limited only by the claims which follow:

I claim:

1. A valve comprising:
   a tubular valve body having an inlet, an outlet and a flow passage therebetween;
   a valve seat carried by said valve body at said inlet;
   a cylindrical cage carried by said valve body the interior of which defines a cylindrical enclosure open at the end nearest said inlet and partially closed by an end wall at the opposite end, an aperture being centrally disposed in said end wall providing fluid communication between the interior of said cage and said flow passage, the exterior of said cage and the surrounding portion of said valve body defining an annular chamber which is in fluid communication with the interior of said cage through port means in the cylindrical walls of said cage; and
   a ball closure member carried within said cage for limited axial movement therein between a seated terminal position engaging said seat, blocking reverse flow of fluid through said flow passage, and an unseated terminal position engaging said end wall and blocking said aperture, permitting flow of fluid through said port means and said flow passage, in response to a decrease in fluid pressure within said valve body relative to fluid pressure at said inlet.

2. The valve of claim 1 in which said port means is located at a distance from said end wall at least as great as the radius of said ball closure member so that when said ball closure member is in its unseated position fluid flows through said inlet, said port means, said annular chamber and said outlet without having to flow around the surfaces of said ball closure member.

3. The valve of claim 2 in which said port means comprises a plurality of flow ports radially disposed around the cylindrical walls of said cage.

4. The valve of claim 1 in which the internal diameter of said cylindrical cage is slightly larger than the diameter of said ball closure member permitting substantially free limited axial movement of said ball closure member within said cage but substantially preventing any fluid flow between said ball closure member and the surrounding cage when said ball closure member is in its unseated terminal position.

5. The valve of claim 1 in which said flow passage comprises said cage port means, said annular chamber and a cylindrical chamber between said annular chamber and said outlet.

6. The valve of claim 5 in which said cylindrical chamber terminates at a transversely disposed wall through which said outlet is provided by one or more outlet ports.

7. A valve as set forth in claim 1 in which said outlet comprises one or more outlet ports in a transversely disposed wall at the outlet end of said valve body.

8. A valve as set forth in claim 7 in which one of said outlet ports is coaxially aligned with the central axis of said valve body and is adapted to engagingly receive a rod member by which an axial force may be applied to said valve for reciprocation thereof within a surrounding coaxially aligned tubular member.

9. A valve as set forth in claim 8 in which the other of said outlet ports are radially disposed around said one port so that flow therethrough is substantially parallel with said central axis of said valve body.

10. A valve comprising:

a tubular valve body having an inlet, an outlet and a flow passage therebetween;

a valve seat carried by said valve body at said inlet;

a cylindrical cage carried by said valve body the interior of which defines a cylindrical enclosure one end of which opens near said inlet and the other end of which is closed by an end wall with a centrally disposed aperture therein, the exterior of said cage and the surrounding portion of said valve body defining an annular chamber, the cylindrical walls of said cage having port means therein which with said annular chamber form at least a portion of said valve flow passage; and a ball closure member carried within said cage for limited axial movement therein between a seated terminal position engaging said seat, blocking reverse flow of fluid through said flow passage, and an unseated terminal position engaging said end wall, blocking fluid flow through said cage aperture and unblocking flow of fluid through said flow passage.

11. A valve as set forth in claim 10 in which said ball closure member is movable toward said unseated terminal position in response to a decrease in pressure within said valve body relative to fluid pressure at said inlet.

12. A valve as set forth in claim 11 in which said aperture provides fluid communication between the interior of said cage and said flow passage, when said ball closure member is in said seated terminal position, but is blocked from said valve inlet by said ball closure member upon its movement toward said unseated terminal position.

13. A valve as set forth in claim 10 in which said valve body terminates at a transverse end wall through which said outlet is provided by one or more outlet ports so that all fluid flow through said valve is confined within the walls of said tubular valve body.

14. A valve as set forth in claim 13 in which one of said outlet ports may be centrally disposed in said transverse end wall and adapted to engagingly receive a rod member by which an axial force may be applied to said valve for reciprocation thereof within a surrounding coaxially aligned tubular member.

* * * * *